United States Patent [19]
Neuwirth et al.

[11] Patent Number: 6,102,185
[45] Date of Patent: Aug. 15, 2000

[54] LOW PROFILE FLOW TRACK STORAGE MODULE

[75] Inventors: Frank J. Neuwirth, Wall; Harold Pfeiffer, Forked River, both of N.J.

[73] Assignee: Unex Manufacturing Inc., Jackson, N.J.

[21] Appl. No.: 08/990,676

[22] Filed: Dec. 15, 1997

[51] Int. Cl.[7] .................................................. B65G 13/00
[52] U.S. Cl. ........................ 193/35 R; 198/340; 211/187
[58] Field of Search ........................... 193/35 R; 198/340, 198/502.1; 414/274, 276; 211/187

[56] References Cited

U.S. PATENT DOCUMENTS

| | | | |
|---|---|---|---|
| 3,854,889 | 12/1974 | Lemelson | 198/349 X |
| 4,453,641 | 6/1984 | Rasmussen et al. | 211/187 X |
| 4,765,493 | 8/1988 | Kinney | 193/35 R X |
| 5,295,591 | 3/1994 | Slater | 211/187 X |
| 5,474,412 | 12/1995 | Pfeiffer et al. | 193/35 R X |
| 5,845,794 | 12/1998 | Highsmith | 211/187 X |

*Primary Examiner*—Christopher P. Ellis
*Assistant Examiner*—Gene O. Crawford
*Attorney, Agent, or Firm*—Salzman & Levy

[57] ABSTRACT

A low profile flow track is described for use in storage facilities, such as warehouses. The flow track requires no assembly upon the pallet rack frame, and does not add appreciable height to the space allotted between the pallet rack beams for storing containers and other items. The flow track has an end plate that is positioned just one inch on top of the horizontal support surface of the pallet rack beam. The end plate is secured to the sides of the flow track, and side plates are specially contoured to provide support upon the step profile of the pallet rack beam.

16 Claims, 4 Drawing Sheets

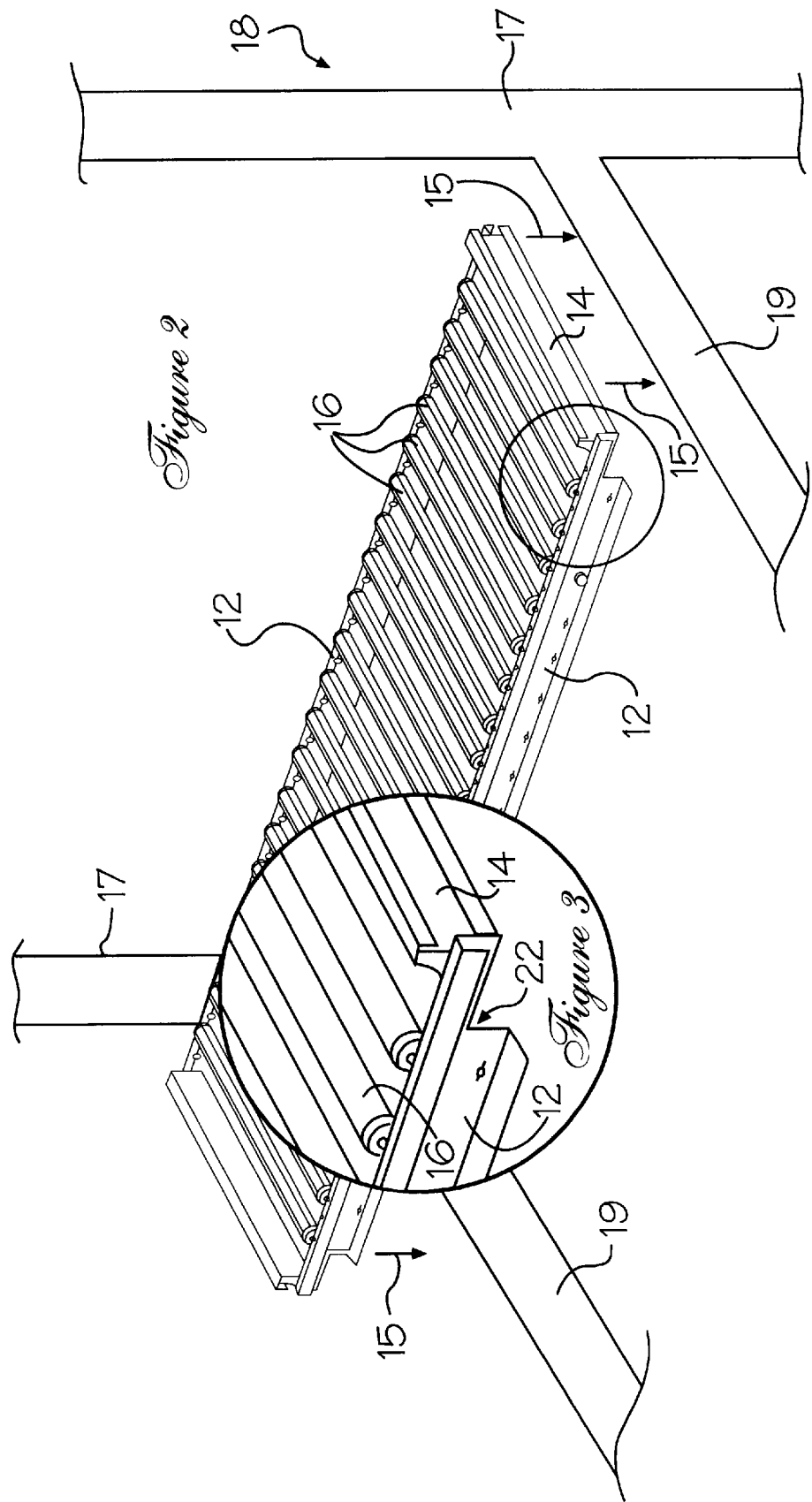

LOW PROFILE FLOW TRACK STORAGE MODULE

FIELD OF THE INVENTION

The present invention relates to warehouse storage apparatuses and, more particularly, to a low profile, modular, flow deck that provides easy assembly to tiers of pallet rack assemblies, and that makes possible easy access to stored containers disposed upon these pallet racks.

BACKGROUND OF THE INVENTION

The storage of containers, boxes, and other storage items has always presented the warehouse engineer with difficult choices. One objective of the warehouse engineer is to store as many items as possible in a given storage space, while still being able to provide normal and efficient access thereto. The problem with high density storage design is that the shortening of the height of the tiers of adjacent pallet racks provides densification of materials within a given floor space at the expense of severely restricting access to the containers disposed upon the racks.

It is not uncommon to find that material handling personnel are often thwarted in their attempts to access containers disposed behind other containers in a row of containers stored on a given pallet rack tier.

In recent times, flow tracks have become popular as a means of loading and unloading containers on pallet racks. These flow tracks allow materials to move easily over the rollers of the tracks, thus making it convenient to load and unload containers. However, it is still a requirement of accessibility that these pallet rack tiers be spaced a minimum height distance in order to allow for ease of flow and for proper handling.

One of the current disadvantages with the present use of flow tracking, however, is that the tracks must be bolted to the pallet rack frames for support. This is both a laborious setup inconvenience and a waste of tier height space. The height of the flow tracks themselves increase overall height of the storage tiers. The addition of only a few inches to each tier eliminates a whole tier after only approximately five tiers have been constructed.

The present invention features a new type of flow track that has an extremely low profile. The low profile flow track of this invention requires no mechanical attachment to the pallet rack beams, and adds only approximately one inch to the overall height of the tier space allocated for the stored articles. The low profile flow track is safely secured when dropped into place on the form beam of the pallet rack. The low profile flow track is merely dropped upon the support beam without requiring tooling, fasteners or attachments of any kind.

The current invention comprises a flow track that has an end plate positioned just one inch on top of the horizontal support surface of the pallet rack beam. The end plate is secured to the sides of the flow track. The ends of the side plates are specially contoured to provide support on the L-shaped pallet rack beam. The side plates are curvilinear and wrap about the step profile of the pallet rack beam to allow the track to rest above and below the horizontal top surface of the beam. In this fashion, the overall height of the flow track is diminished with respect to its position upon the tier.

In addition to presenting a minimum height profile to the tier, the end plate of the flow track functions as the end stop, and also provides means to present a name plate. The end plate has upper and lower slots that accommodate and support an identification insert.

SUMMARY OF THE INVENTION

In accordance with the present invention, there is provided a low profile flow track for use in storage facilities, such as warehouses. The flow track requires no assembly on the pallet rack frame, and does not add appreciable height to the space allotted between the pallet rack beams for storing containers and other storage items. The flow track has an end plate that is positioned just one inch on top of the horizontal support surface of the pallet rack beam. The end plate is secured to the sides of the flow track. The side plates are specially contoured to provide support on the L-shaped pallet rack beam. The side plate ends are curvilinear and wrap about the step profile of the pallet rack beam to allow the track to rest above and below the horizontal top surface of the beam. In this fashion, the overall height of the flow track is diminished with respect to its position upon the tier. In addition to presenting a minimum height profile to the tier, the end plate of the flow track, which serves as the product stop, also has means for presenting a name tag. The end plate has upper and lower grooves that receive an identification insert.

It is an object of this invention to provide an improved flow track for the storage of articles upon pallet rack tiers of a storage facility.

It is another object of the invention to provide a low profile flow track that does not add appreciable height to the space allotted for storage containers.

It is a further object of this invention to provide an improved flow track that requires no assembly to the tier of a pallet rack assembly.

BRIEF DESCRIPTION OF THE DRAWINGS

A complete understanding of the present invention may be obtained by reference to the accompanying drawings, when considered in conjunction with the subsequent detailed description, in which:

FIG. 2 depicts a perspective, in situ view of the flow track shown in FIG. 1, being assembled to a pallet rack assembly;

FIG. 3 shows an enlarged, partial view of the circled portion of the flow track depicted in FIG. 2;

For purposes of brevity and clarity, like elements and components share the same numbers and designations throughout the figures.

DESCRIPTION OF THE PREFERRED EMBODIMENT

Generally speaking, the invention pertains to a low profile flow track used to store and convey articles upon tiers of pallet rack assemblies. The flow track features a low profile by virtue of its unique end of side plates that are contoured to the shape of the pallet rack beam, thus allowing the flow track to be supported above and below the horizontal support surface of the beam. The contoured shape, which forms an L-shaped groove, allows the flow track to be assembled to the pallet rack without the need for tools and laborious assembly procedures common to other such flow tracks.

Figure 1:
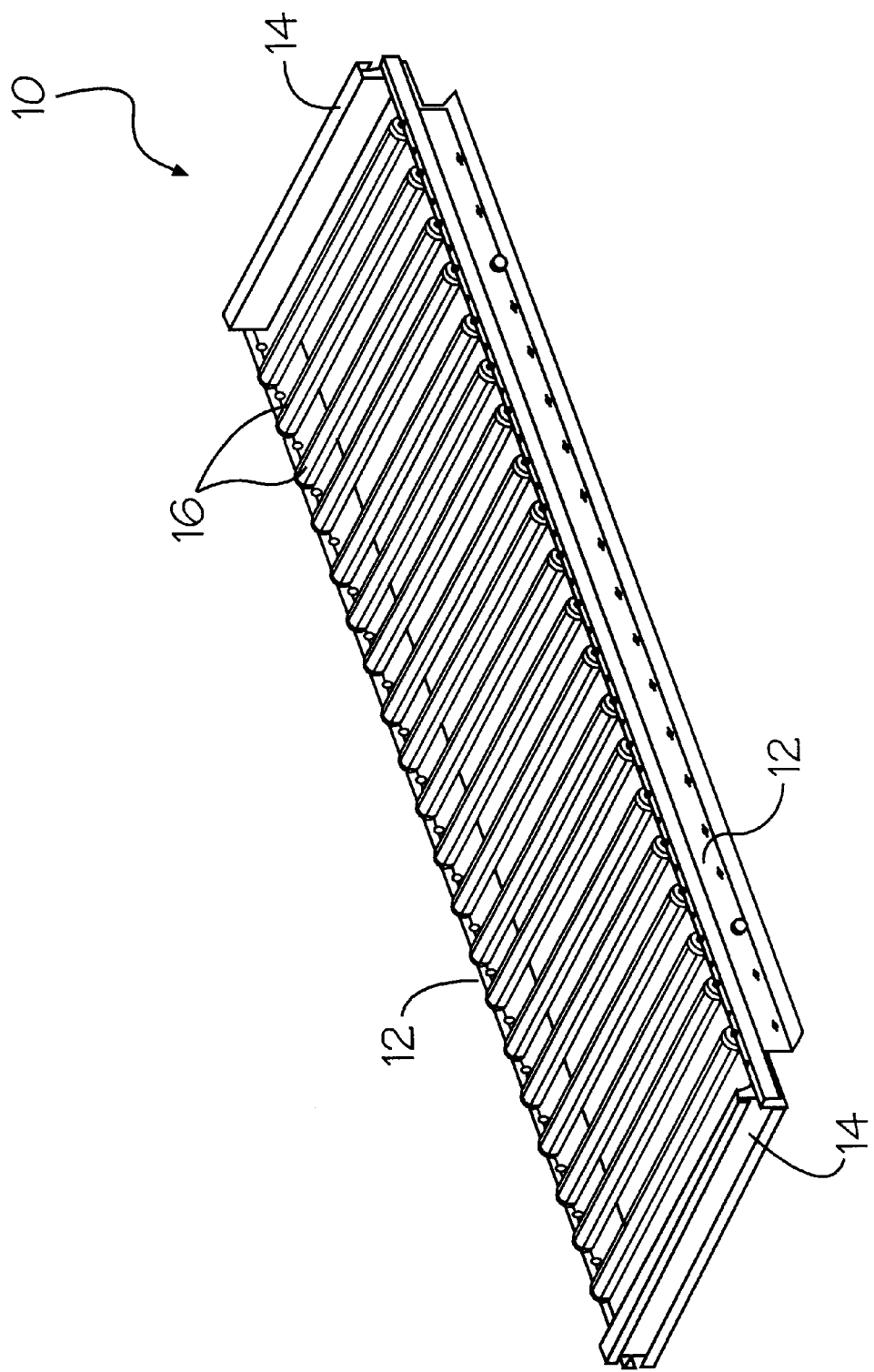
FIG. 1 illustrates a perspective view of the low profile flow track of this invention.
Figure 7:
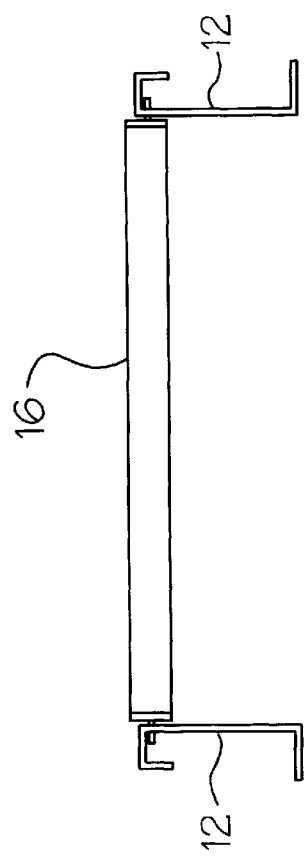
FIG. 7 illustrates a sectional view of the low profile flow track shown in FIGS. 1 and 2.

Now referring to FIGS. 1 and 2, the low profile flow track 10 of this invention is illustrated. The flow track 10 comprises a frame having two side rails 12 and a pair of distally disposed end plates 14, as shown in greater detail in FIGS. 4, 5 and 7. A plurality of rotatively affixed rollers 16 is spaced along, and secured for rotation within, the side rails 12. The side rails 12 are bolted together by spanning rods 21 (FIG. 5).

In FIG. 2, the flow track 10 is shown being installed (arrows 15) upon a pallet rack tier 18. The tier 18 comprises vertical frame posts 17 that support horizontal beams 19. The flow track 10 drops upon the support beams 19 and requires no mechanical attachment thereto.

Figure 6:
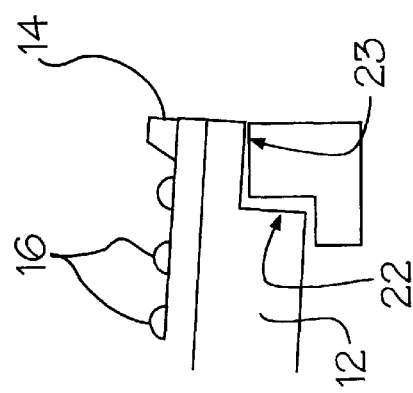
FIG. 6 shows a partial, in situ side view of the end plate of FIG. 5, resting upon a pallet rack support beam.

The low profile of the flow track 10 is achieved by means of the unusual curvilinear contour 22 on the ends of the side rails 12 that fit and match the step profile of beams 19, and are compatible therewith, as best illustrated in FIGS. 3 and 6. This contour 22 allows flow track 10 to be projected above and below the top, horizontal surface 23 of beam 19, as shown in FIG. 6.

Figure 4:
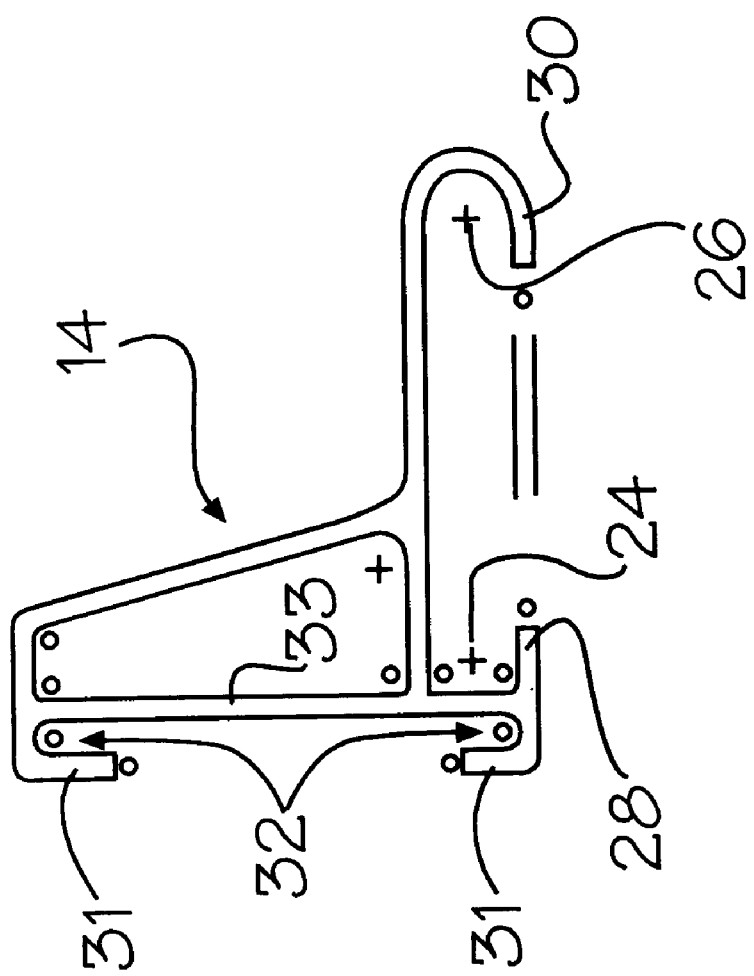
FIG. 4 illustrates a sectional view of the end plate of the low profile flow track shown in FIG. 1.
Figure 5:
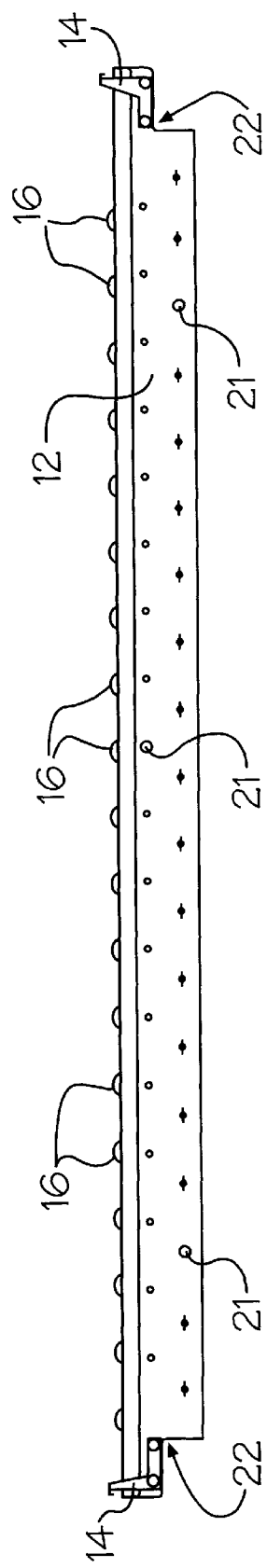
FIG. 5 depicts a side view of the low profile flow track illustrated in FIGS. 1 through 3.

Referring to FIG. 4, the end plate 14 is shown in sectional view. The end plate 14 is attached to the side rails 12 by means of two elongated screws (not shown) that transversely project from the side rails 12 through the end plate 14 at points 24 and 26, respectively. The elongated screws are captured in wells 28 and 30, respectively, thus anchoring the end plate 14 between the side rails 12. The end plate 14 comprises a pair of flange members 31 that form slots 32 with respect to the frame 33. The slots 32 allow for the insertion of an identification tag therein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A low profile flow track that is drop loaded upon a support surface of distally disposed support beams of a storage frame, said low profile flow track comprising:
    a plurality of spaced-apart, elongated rollers; and
    a pair of spaced-apart side rails that rotatively support said plurality of spaced-apart, elongated rollers, each of said side rails having a contoured section disposed upon distal ends thereof, each of said contoured sections having a cut-out portion that steps down about, and is compatible with, a profile of said support beams, whereby said low profile flow track can be drop loaded upon said storage frame with a low profile that projects above and below said support surface of each of said support beams.

2. The low profile flow track in accordance with claim 1, wherein each of said contoured sections is curvilinear.

3. The low profile flow track in accordance with claim 1, further comprising a pair of end plates secured at distal ends of said side rails.

4. The low profile flow track in accordance with claim 3, wherein each of said pair of end plates includes a pair of flange members defining a slot for an identification tag.

5. The low profile flow track in accordance with claim 3, wherein each of said pair of end plates includes means defining a product end stop.

6. A low profile flow track that is drop loaded upon a support surface of distally disposed support beams of a storage frame, said low profile flow track comprising:
    a plurality of spaced-apart, elongated rollers; and
    a pair of spaced-apart side rails that rotatively support said plurality of spaced-apart, elongated rollers, each of said side rails having a curvilinear contour disposed upon distal ends thereof, each contour having a cut-out portion that steps down about, and is compatible with, a step profile of said support beams, whereby said low profile flow track can be drop loaded upon said storage frame.

7. The low profile flow track in accordance with claim 6, further comprising a pair of end plates secured at distal ends of said side rails.

8. The low profile flow track in accordance with claim 7, wherein each of said pair of end plates includes a pair of flange members defining a slot for an identification tag.

9. The low profile flow track in accordance with claim 7, wherein each of said pair of end plates includes means defining a product end stop.

10. A low profile flow track that is drop loaded upon a support surface of distally disposed support beams of a storage frame, said low profile flow track comprising a pair of spaced-apart side rails that rotatively supports a plurality of spaced-apart, elongated rollers, each of said side rails having a contoured section disposed upon distal ends thereof, each of said contoured sections having a cut-out portion that steps down about, and is compatible with, a matching cross-sectional shape of said support beams, whereby said low profile flow track can be drop loaded upon said storage frame with a low profile.

11. The low profile flow track in accordance with claim 10, wherein each of said contoured sections is curvilinear.

12. The low profile flow track in accordance with claim 10, further comprising a pair of end plates secured at distal ends of said side rails.

13. The low profile flow track in accordance with claim 12, wherein each of said pair of end plates includes a pair of flange members defining a slot for an identification tag.

14. The low profile flow track in accordance with claim 12, wherein each of said pair of end plates includes means defining a product end stop.

15. A low profile flow track that is drop loaded upon a support surface of distally disposed support beams of a storage frame, said low profile flow track comprising:
    a plurality of spaced-apart, elongated rollers; and
    a pair of spaced-apart side rails that rotatively supports said plurality of spaced-apart, elongated rollers, each of said side rails having an end surface section disposed upon distal ends thereof, each of said end surface sections having a cut-out portion that steps down about, is compatible with, and is matching with a profile of, said support beams, whereby said low profile flow track can be drop loaded upon said storage frame with a low profile that projects above and below said support surface of each of said support beams.

16. A low profile flow track that is drop loaded upon a support surface of distally disposed support beams of a storage frame, said low profile flow track comprising:
    a plurality of spaced-apart rollers; and a pair of side rails that rotatively supports said plurality of spaced-apart rollers, each of said side rails having an end section disposed upon distal ends thereof, each of said end sections having an L-shaped surface that is compatible with, and which matches a step profile of, said support beams, whereby said low profile flow track can be drop loaded upon said storage frame with a low profile that projects above and below said support surface of each of said support beams.

\* \* \* \* \*